May 11, 1948. A. M. CANDY 2,441,257
WELDING STUD
Filed July 13, 1946
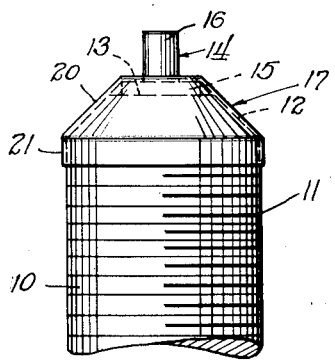
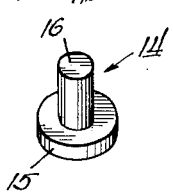
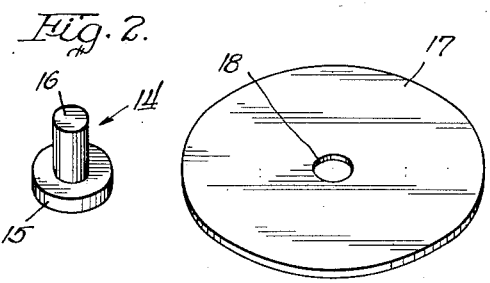
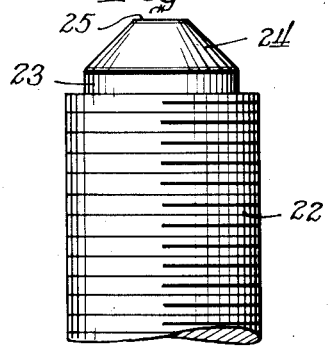
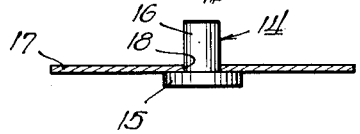
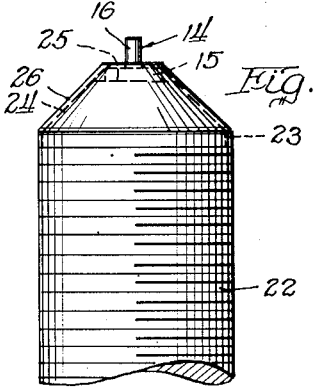
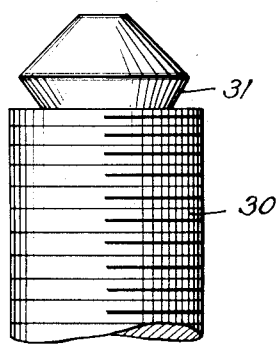
Inventor:
Albert M. Candy.
By Brown, Jackson, Boettcher & Dienner
Attys.

Patented May 11, 1948

2,441,257

UNITED STATES PATENT OFFICE 2,441,257

WELDING STUD

Albert M. Candy, La Grange, Ill., assignor, by mesne assignments, to National Cylinder Gas Company, Chicago, Ill., a corporation of Delaware Application July 13, 1946, Serial No. 683,293

6 Claims. (Cl. 287—20.2)

My invention relates, generally, to the welding of studs to work features, and it has particular relation to the manufacture of the studs that are used for this purpose.

This application is a continuation-in-part of my copending applications, Serial No. 625,541, filed October 30, 1945, and Serial No. 674,994, filed June 7, 1946.

In my co-pending application, Serial No. 625,541, I have disclosed a stud, such as a threaded stud, which may be used in known forms of stud welding guns for attaching the stud to a work piece, such as metal plates, by an arc welding process. In general, the stud is brought into contact with the work piece to establish the circuit therebetween from the welding current source, and then the stud is withdrawn a slight distance from the work so as to permit an arc to be drawn therebetween sufficient to melt the required amount of metal from the work piece and the stud. The stud is then impelled toward the work piece into the metal, thus made molten, whereupon the weld solidifies, thereby making the stud substantially integral with the work. Immediately thereafter the flow of current is cut off.

As set forth in my co-pending application Serial No. 625,541, I provide a cap of aluminum over the end of the stud which is to be welded to the work piece, which cap is melted when the arc is formed. The aluminum cap is provided in order to furnish the initial electrical contact with the work piece, to unite with atmospheric oxygen, to scavenge the weld so as to prevent the formation of undesired oxide, and to unite with the weld metal so as to improve the grain structure thereof and provide the desired contour of the fillet metal formed around the stud end.

It was found that, in some instances, when the aluminum cap of co-pending application Serial No. 625,541 was employed, too much aluminum was present in the weld metal. As a result, the weld metal tended to be brittle or coarse, or both, and to be unsatisfactory in that it did not have the required strength. The weld metal could be improved to a certain degree by using an appreciably greater amount of current than would normally be required. This, however, would result in liquefying an undesirable amount of metal, both in the work piece and at the end of the stud. Moreover, the appearance of the surface of the weld metal or of the fillet between the stud and the work piece left much to be desired.

In my second co-pending application, Serial No. 674,994, an improved metal stud and method of making the same is disclosed, wherein the aluminum cap of my co-pending application of Serial No. 625,541 is replaced with a small plug of aluminum. The small plug may take several forms, and may project co-axially from the end of the stud, or may lie horizontally in a slot milled through the end thereof. The end of the stud may be deformed, such as by peening, so as to retain the small aluminum plug in place.

One particularly desirable feature of the invention disclosed in my co-pending application Serial No. 674,994, is the feasibility of providing the aluminum end plugs in the most advantageous size or weight. There must be a certain minimum amount of the aluminum or other metal present to protect the weld between the end of the stud and the work piece. However, as explained, the aluminum must not be in excess or it will impair the characteristics of the weld obtained.

The present invention is specifically directed to a particularly advantageous arrangement for securing the aluminum plugs to the end of the stud to be welded. Briefly, the aluminum plugs are provided in the form of rivets, with the head ends held against the ends of the studs by means of steel caps crimped over the ends of the studs, and having central openings through which the ends of the aluminum rivets project.

Among the objects of my invention are:

To provide a metal stud for arc welding to a work piece having secured to the end thereof, by an improved arrangement, a piece of weld promoting metal; to make the piece of weld promoting metal of aluminum so as to facilitate the use of alternating currents for making the weld; to correlate the amount of the metal in the piece so that it will be in just sufficient amount to properly unite with the metal made molten by the heat of the arc, and so as to scavenge the same and refine and improve the grain structure thereof without rendering brittle the resulting weld metal at the junction of the spot and work piece; to utilize apertured stampings as an inexpensive means for securing the pieces of aluminum in the form of rivets to the ends of the studs; and, to shape the ends of the studs with a somewhat reduced diameter so that when the retaining discs are drawn and crimped thereover the resultant diameter will be approximately uniform for the length of the studs.

Other objects of my invention will, in part, be obvious, and will in part appear hereinafter.

When the piece of weld promoting metal is formed of aluminum in the form of a rivet, and is held against the end of the stud so that the shank projects therefrom so as to form the sole initial contact with the work piece, the use of alternating current for making the weld is greatly facilitated. When direct current is employed, it is not necessary to have the aluminum rivet extend beyond the stud to make the contact with the work piece. However, because of the more widespread availability of alternating current as compared to direct current, and particularly in the amperages required, it is essential that the studs be made or tipped so that they can be welded satisfactorily with alternating current.

For a more complete understanding of the nature and scope of the invention, reference may be had to the following detailed description thereof, taken in connection with the accompanying drawings wherein:

Figure 1 is a view in side elevation of the end of a stud to be welded to a work piece, showing a rivet of aluminum held on the end of a stud by means of a thin metal disc drawn over the end of the stud and crimped so as to form a cap thereon;

Figure 2 is a perspective view of the aluminum rivet utilized in Figure 1;

Figure 3 is a perspective view of the thin metal disc provided with a central opening for fitting over the shank of the rivet of Figure 2 and adapted to be drawn over and crimped onto the end of the stud as shown in Figure 1;

Figure 4 is a side elevational view showing the rivet of Figure 2 inserted into the disc of Figure 3 prior to the deforming of the latter onto the stud;

Figure 5 is an elevational view of a stud having a reduced diameter at the upper end for receiving the skirt of a deformed metal disc of the type shown in Figure 3;

Figure 6 is an elevational view of the stud in Figure 5 with a rivet of aluminum, or other metal, secured over the end thereof; and Figure 7 is an elevational view of a stud, similar to the stud shown in Figure 5, but wherein the reduced diameter section is inwardly tapered in the form of an inverted frustrum of a cone.

Referring particularly to Figure 1 of the drawing, the reference character 10 designates a stud which is to be arc-welded to a work piece in the manner described generally hereinbefore. The stud may be formed of low carbon steel. However, it may also be formed of other material, such as stainless steel. The stud 10 may or may not be threaded, for part or all of its length, as indicated at 11.

The end of the stud 10, which is to be welded to the work piece, is beveled, as indicated at 12, so as to leave a small circular end surface 13. The circular, flat end 13 is made co-axial, or nearly so, with the stud 10.

In order to scavenge the weld metal to improve the characteristics thereof and facilitate the use of alternating current, I provide a small piece of metal, preferably aluminum, in the form of a rivet, as indicated generally at 14 in Figure 2. The rivet 14 has a head 15 and a shank 16. In use, the rivet 14 is placed on the flat end 13 of the stud 10, with the rivet head 15 resting thereon as shown in Figure 1.

In order to retain the rivet 14 in place, I employ a thin disc of easily deformable material, as indicated in Figure 3 by the reference 17. The disc 17 is preferably formed of a thin steel stamping, and is provided with a central opening or hole 18, which is sufficiently large to readily accommodate the shank 16 of the rivet 14. In Figure 4 of the drawing, I show the rivet 14 placed in the disc 17 prior to deforming the latter onto the end of the stud 10.

The disc 17 may be deformed over the head of the stud 10 by suitable drawing tools so as to form a cap 20 as shown in Figure 1. The disc 17 should contain sufficient material so as to provide a narrow skirt section 21, which may be crimped onto the full diameter portion of the stud 10.

It will be noted in Figure 1 that the thickness of the cap at the skirt 21 makes a narrow shoulder at the end of the stud 10. In case such a shoulder is considered to be undesirable, it can be readily eliminated by shaping the end of the stud in the manner illustrated in connection with Figure 5 of the drawing. Referring to Figure 5, a stud is indicated at 22, wherein the end is beveled and reduced so as to provide a reduced diameter section 23, a beveled section 24 and a flat circular end 25. The aluminum rivet 14 and disc 17 of the Figures 2 and 3, respectively, may be used in connection with a stud 22 so as to provide a completed article as shown in Figure 6 of the drawing. It will be noted that the reduced diameter section 23 permits the cap 26 to be flush with the remainder of the stud 22 at the section 23.

In Figure 7 of the drawings a stud 30 is shown which is a modification of stud 22 of Figure 5. The modification resides in forming an inverted frusto conical section 31 at the beveled end, which affords greater retention for a cap deformed thereover.

It will be apparent that the particular dimensions for the aluminum rivet 14 and the steel disc 17 will depend upon the particular size of studs to which they are to be applied. Those skilled in the art will be able to arrive at the proper sizes and specifications without difficulty, in view of the above disclosure.

The size of the rivet 14 should be such that it provides just a sufficient amount of metal to unite with the metal made molten by the arc, to refine and improve the grain structure thereof without rendering brittle the resulting weld metal forming the junction of the stud to the work piece, and to provide sufficient aluminum to unite with the oxygen present at the stud and so as to prevent formation of iron oxide or any other undesirable oxide.

As an indication of the size of rivet 14 required, for a stud having a diameter of $\%$", the amount of aluminum in the rivet should not exceed 50 to 60 milligrams. It appears that 30 milligrams would be sufficient from a metallurgical standpoint, but at the present time, mechanical limitations and available aluminum wire make it difficult to limit the amount of aluminum to this extent. For studs having diameters ranging from ¼" to ¾", the rivets should have an aluminum content ranging from 30 to 60 milligrams.

In order to assure a positive operation using alternating current, the rivet 14 should extend beyond the end of the retaining cap from $\frac{1}{16}$" to $\frac{5}{64}$". If a shorter extension, such as $\frac{1}{32}$", is used, it is likely that the stud will freeze to the work piece, especially when using alternating current, before the control mechanism and the stud gun operating parts can withdraw it therefrom to strike the arc.

Aluminum is the preferred metal for forming the rivet 14 because of its availability and great affinity for oxygen. When it is fused by the heat of the arc, it unites with the atmospheric oxygen in the immediate vicinity, such as within a ferrule surrounding the stud end, and greatly minimizes or entirely prevents the formation of iron oxide in the weld metal, which is an undesirable constituent thereof. However, aluminum alloys and other types of metals may be used providing their properties are suitable.

Since further changes may be made in the foregoing construction without departing from the spirit and scope of my invention, it is intended that all matter shown in the accompanying drawing and described hereinbefore be interpreted as illustrative, and not in a limiting sense.

I claim as my invention:

1. In combination, a metal stud adapted to be arc welded by alternating current at one end to a metal work piece, a rivet-shaped piece of metal having its head end held against said one end of said metal stud to be welded, said rivet-shaped piece of metal being characterized by being of such material and in just sufficient amount to unite with the metal made molten by the heat of the arc so as to scavenge the same and refine and improve the grain structure thereof without rendering brittle the resulting weld metal at the junction of the stud and work piece, and a cap of thin material, having an opening through which the shank of said rivet-shaped piece of metal projects, crimped over the said one end of said stud so as to hold said rivet-shaped piece of metal in place.

2. The invention, as set forth in claim 1, wherein the stud is formed of steel and said rivet-shaped piece of metal is formed of aluminum.

3. The invention, as set forth in claim 1, wherein the stud and cap are formed of steel, and said rivet-shaped piece of metal is formed of aluminum.

4. The invention, as set forth in claim 1, wherein the stud and cap are formed of steel, and said stud has a reduced diameter at said end to be welded so that when said cap is crimped thereover the resultant outside diameter will be approximately the same as that of said stud for the greater portion of its length.

5. The invention, as set forth in claim 1, wherein said end of the stud to be welded is beveled so as to leave at the tip thereof a flat area of reduced diameter against which the head of said rivet-shaped piece of metal may be held.

6. The invention, as set forth in claim 1, wherein said end of the stud to be welded has an inverted frusto-conical section over which said cap may be crimped for improved retention.

ALBERT M. CANDY.